United States Patent
DeMartino et al.

(10) Patent No.: US 7,239,785 B2
(45) Date of Patent: Jul. 3, 2007

(54) METHOD OF PREVENTING OPTICAL FIBER FAILURE IN HIGH POWER APPLICATION

(75) Inventors: Steven E. DeMartino, West Elmira, NY (US); Michael E. DeRosa, Painted Post, NY (US); Gregory S. Glaesemann, Corning, NY (US); Stephan L. Logunov, Corning, NY (US); Ulrich W. H. Neukirch, Painted Post, NY (US); Michael J. Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/026,458

(22) Filed: Dec. 30, 2004

(65) Prior Publication Data

US 2006/0147168 A1    Jul. 6, 2006

(51) Int. Cl.
*G02B 6/02* (2006.01)
*G02B 6/036* (2006.01)

(52) U.S. Cl. .................................................. 385/128
(58) Field of Classification Search ................. 385/128
See application file for complete search history.

(56) References Cited

U.S. PATENT DOCUMENTS

| | | | |
|---|---|---|---|
| 4,474,830 A | 10/1984 | Taylor | 427/54.1 |
| 4,511,209 A | 4/1985 | Skutnik | 350/96.34 |
| 4,851,165 A | 7/1989 | Rennell, Jr. et al. | 264/1.5 |
| 4,968,116 A | 11/1990 | Hulme-Lowe et al. | 350/96 |
| 4,973,129 A | 11/1990 | Fukuzawa et al. | 350/96.33 |
| 5,024,507 A | 6/1991 | Minns et al. | 350/96.34 |

(Continued)

FOREIGN PATENT DOCUMENTS

JP           02262606 A     * 10/1990

(Continued)

OTHER PUBLICATIONS

R.M. Percival et al, "Catastrophic damage and accelerated ageing in bent fibres caused by high optical powers", Electronics Letters, Mar. 2, 2000, vol. 36, No. 5, pp. 414-416.

(Continued)

*Primary Examiner*—Michelle Connelly-Cushwa
*Assistant Examiner*—Chris Chu
(74) *Attorney, Agent, or Firm*—Robert L. Carlson (57) ABSTRACT

A method of minimizing localized heating of, or minimizing signal losses across a source of loss in, an optical fiber used in transmission of a high power optical signal at an operating wavelength. These methods include the steps of: providing an optical fiber which comprises either (i) a coating characterized by an absorbance of less than about 4.5 dB/cm at the operating wavelength or (ii) a refractive index lower than the refractive index of a cladding layer of the optical fiber by more than about $3 \times 10^{-3}$ at the operating wavelength, or (iii) both (i) and (ii); and transmitting a optical signal having a power greater than about 250 mW through the optical fiber, wherein the coating, cladding layer, or combination thereof are selected to minimize localized heating of the optical fiber or to result in a signal loss across a source of loss that is less than about 250 mW at the operating wavelength.

17 Claims, 3 Drawing Sheets

U.S. PATENT DOCUMENTS

| | | | |
|---|---|---|---|
| 5,148,511 A | 9/1992 | Savu et al. | 385/145 |
| 5,239,026 A | 8/1993 | Babirad et al. | 526/245 |
| 5,596,669 A | 1/1997 | Murphy et al. | 385/128 |
| 5,756,209 A | 5/1998 | Hale | 428/392 |
| 5,822,489 A | 10/1998 | Hale | 385/145 |
| 5,898,715 A * | 4/1999 | LeGrange et al. | 372/6 |
| 5,966,491 A * | 10/1999 | DiGiovanni | 385/127 |
| 6,154,596 A * | 11/2000 | Ionov | 385/128 |
| 6,204,304 B1 | 3/2001 | Houlihan et al. | 522/88 |
| 6,249,638 B1 | 6/2001 | Hale | 385/145 |
| 6,326,416 B1 | 12/2001 | Chien et al. | 522/91 |
| 6,333,821 B1 * | 12/2001 | Kruger et al. | 359/642 |
| 6,369,179 B1 | 4/2002 | Stacey et al. | 526/245 |
| 6,501,894 B2 * | 12/2002 | Dultz et al. | 385/128 |
| 6,531,522 B1 | 3/2003 | Winningham | 522/96 |
| 6,539,152 B1 | 3/2003 | Fewkes et al. | 385/114 |
| 6,563,996 B1 | 5/2003 | Winningham | 385/128 |
| 6,584,263 B2 | 6/2003 | Fewkes et al. | 385/128 |
| 6,596,394 B2 | 7/2003 | Toler et al. | 428/392 |
| 6,603,901 B1 | 8/2003 | Hale et al. | 385/37 |
| 6,680,118 B2 | 1/2004 | Szum et al. | 428/375 |
| 6,689,463 B2 | 2/2004 | Chou et al. | 428/378 |
| 6,760,527 B2 | 7/2004 | Berkey et al. | 385/123 |
| 6,775,451 B1 | 8/2004 | Botelho et al. | 385/128 |
| 6,849,333 B2 | 2/2005 | Schissel et al. | 428/392 |
| 6,862,392 B2 | 3/2005 | Fabian et al. | 385/128 |
| 6,959,022 B2 * | 10/2005 | Sandrock et al. | 372/6 |
| 7,030,209 B2 * | 4/2006 | Blomquist et al. | 528/401 |
| 2002/0168139 A1 * | 11/2002 | Clarkson et al. | 385/27 |
| 2003/0095770 A1 | 5/2003 | Fewkes et al. | 385/128 |
| 2003/0123839 A1 | 7/2003 | Chou et al. | 385/145 |
| 2003/0180029 A1 * | 9/2003 | Garito et al. | 385/142 |
| 2003/0199603 A1 | 10/2003 | Walker et al. | 522/99 |
| 2004/0264896 A1 * | 12/2004 | Takahashi et al. | 385/103 |
| 2005/0105866 A1 * | 5/2005 | Grudinin et al. | 385/123 |
| 2005/0158006 A1 * | 7/2005 | Koh et al. | 385/143 |
| 2005/0163424 A1 * | 7/2005 | Chen | 385/37 |
| 2005/0265682 A1 | 12/2005 | Andre et al. | 385/141 |

FOREIGN PATENT DOCUMENTS

| | | |
|---|---|---|
| WO | WO02/072498 | 9/2002 |
| WO | WO03/027037 | 4/2003 |

OTHER PUBLICATIONS

M. Kim et al, "Low Index Fiber Cladding Materials—Behavior under Extreme Conditions", IWCS, Nov. 17, 2004.

U.S. Appl. No. 11/027,861, filed Dec. 30, 2004, entitled "Coated Optical Fiber and Curable Composition Suitable for Coating Optical Fiber".

* cited by examiner

METHOD OF PREVENTING OPTICAL FIBER FAILURE IN HIGH POWER APPLICATION

FIELD OF THE INVENTION

The present invention relates generally to the preparation of optical fibers, and more particularly to the preparation of optical fibers that can withstand high power applications without failure under normal use conditions.

BACKGROUND OF THE INVENTION

In the last several years high optical power reliability in optical fiber and photonic components has become a major concern. This is due to the increasing output power of optical amplifiers in wavelength-division multiplexing systems and the advent of Raman amplification. Though today's C-band amplifiers are capable of launching more than 200 mW of C-band signal, the greatest concern now is in the area of Raman amplification where pump laser systems typically operate in the range of 1-2 W at about 1400 nm to about 1480 nm. When power this high is launched into transmission systems, it can cause long-term degradation of materials that can sometimes lead to catastrophic failure of a component, module, or the fiber itself.

A photothermal heating problem was recently discovered in a fiber re-coat material used to re-coat stripped regions at fusion splice joints of specialty dispersion compensating fibers used in a dispersion compensation module. In particular, a Raman-pumped module was constructed using a dispersion compensating fiber that was fusion spliced to a CS980 fiber (available from Corning Incorporated), and then re-coated with a standard ultraviolet curable urethane acrylate coating (Desolite 950-200, available from DSM Desotech Inc.). Due to the nature of the fiber, high splice losses of approximately 0.5-1.0 dB are common. These splice losses result in power being dumped into the cladding and then ultimately into the fiber re-coat material, where localized heating takes place. In the above-described Raman-pumped module, the module is expected to operate at 1.6 W at 1430-1480 nm, which means that even with the best splice losses achievable today as much as 180-330 mW of radiation can get dumped into the coating material and cause significant heating. In recent laboratory tests it was found that the Desolite 950-200 re-coated fiber splices can heat up to as much as 120-200° C. at 1.6 W of 1480 nm radiation. These temperatures will certainly cause long-term reliability problems with the coating and ultimately the fiber, if not short-term failure.

A similar problem of localized heating was also observed for coated optical fibers designed for high power applications of the type described above, but where the fibers were employed in environments requiring tight bends of the fiber (e.g., present in amplifier modules).

Though components in high power environments were the focus several years ago, today there is growing concern around the fiber and more particularly the fiber coating. It is known that organic materials can absorb radiation in the region of 1400-1620 nm due to vibrational overtones of the C—H, O—H, or N—H bonds commonly found in organic polymeric materials. As these bonds absorb energy, they heat and can cause thermal degradation of the coating. And if the coating integrity becomes compromised, the fiber will fail mechanically. From the foregoing, it should be appreciated that a need exists for optical fibers that can operate in high power applications without long-term or short-term failure caused by localized heating of the fiber coating.

The present invention is directed to overcoming these and other deficiencies in the art.

SUMMARY OF THE INVENTION

A first aspect of the present invention relates to a method of minimizing localized heating of an optical fiber used in transmission of a high power optical signal at an operating wavelength. This method includes the steps of: providing an optical fiber which comprises either (i) a coating characterized by an absorbance of less than about 4.5 dB/cm at the operating wavelength or (ii) a refractive index lower than the refractive index of a cladding layer of the optical fiber by more than about $3\times10^{-3}$ at the operating wavelength at a temperature of 100° C. or less, more preferably at a temperature of 50° C. or less, and most preferably at room temperature, or (iii) both (i) and (ii); and transmitting an optical power greater than about 250 mW through the optical fiber, wherein the coating, cladding layer, or combination thereof are selected to minimize localized heating of the optical fiber due either to a lossy splice junction or a lossy bend in the fiber. By "lossy", we mean a bend or splice that, if not for the coating thereon, would result in significant (i.e., greater 100, 200, or even 250 mW) power loss over a short distance (e.g., 5 cm or less). Preferred operating wavelengths include 1480 and 1550 nm.

The present invention affords a materials-based approach for reducing the localized photothermal temperature rise induced by high optical power in regions where optical power can exit the core of the fiber and enter the cladding such as in tight bends (e.g., present in amplifier modules) or lossy fusion splices. By appropriate selection of coating materials or coating-cladding combinations, either for whole fibers or for re-coating splice junctions, it becomes possible to reduce the localized photothermal temperature rise in high power environments, thereby preventing coating failure. It becomes possible to increase the lifetime of the coating if the overall temperature of the coating can be kept at about 100° C. or lower. The present invention achieves this result.

DETAILED DESCRIPTION OF THE INVENTION

The present invention relates to methods of minimizing localized heating of an optical fiber used in transmission of a high power optical signal at an operating wavelength, which would otherwise occur as a result of power loss which occurs as a result of a lossy spliced fiber junction, a tight fiber bend, or other fiber configurations that can result in power loss over short distance. These methods can be carried out by providing optical fibers with either (i) a coating characterized by an absorbance of less than about 4.5 dB/cm at the operating wavelength, (ii) a refractive index lower than the refractive index of a cladding layer of the optical fiber by more than about $3 \times 10^{-3}$ at a temperature of 100° C. or less, more preferably at a temperature of 50° C. or less and most preferably at room temperature, at the operating wavelength, or (iii) both (i) and (ii). Upon transmission of a high power optical signal at a desired operating wavelength, the selected coating and/or selected cladding layer present on the fiber will reduce optical power loss across tight bends and/or fusion splices and thereby inhibit localized heating of optical fiber in those regions. Preferred operating wavelengths include 1480 and 1550 nm.

As used herein, the term "high power optical signal" refers to any optical signal having a power that is about 250 mW or greater, more preferably about 500 mW or greater, about 600 mW or greater, about 700 mW or greater, about 800 mW or greater, about 900 mW or greater, or about 1 W or greater. Many high power optical signals currently operate in the range of about 1 W to about 2 W, although the present invention is applicable to the carrying of optical signals at both greater and lesser power. High power applications are preferably, though not exclusively, in telecommunications systems. Exemplary high power applications include, without limitation, any transmission fiber downstream of an amplifier such as a Raman amplifiers or erbium doped amplifier, or downstream of a transmitting laser.

As used herein, a desired operating wavelength for a system can be any operating wavelength that is suitable for use in the transmission of a high power optical signal. Exemplary operating wavelengths for high power application include, without limitation, between about 1400 nm and about 1620 nm, more preferably between about 1430 nm and about 1480 nm (for Raman amplification) or between about 1520 nm and about 1580 nm (for FTTH applications).

To minimize localized heating of the fiber and thereby prevent catastrophic failure of the coating and/or optical fiber, it is desirable to minimize heating which might otherwise occur due to power losses which will occur across a splice junction, tight bend, or other source of loss in a high power application. Even with losses of power as high as 100, 200, or even 250 mW, the coatings of the present invention will not heat enough to cause failure across a splice junction, tight bend, or other source of loss in high power application.

Figure 1:
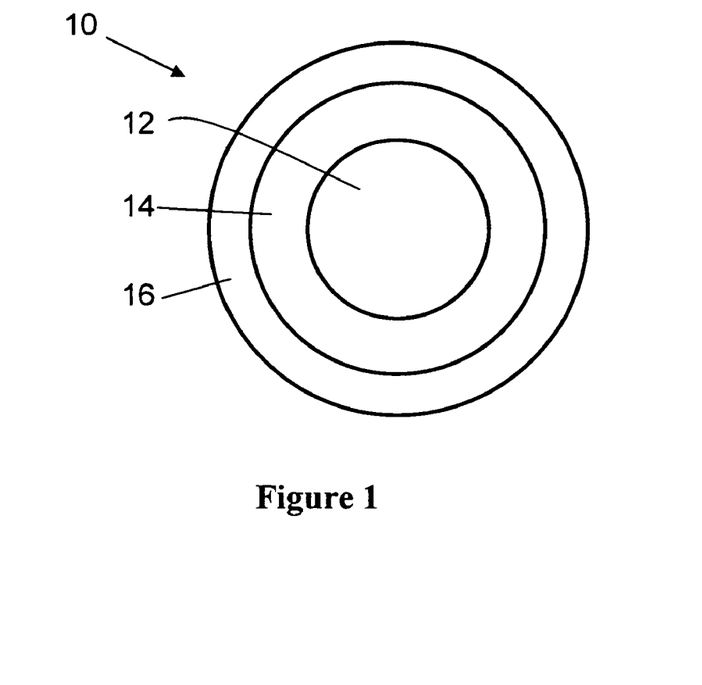
FIG. 1 is a cross-sectional view of an optical fiber of the present invention.

A typical geometry for an optical fiber is illustrated in FIG. 1. The optical fiber 10 is characterized by a glass fiber 12, a primary coating 14 which surrounds the glass fiber, and a secondary or outer coating 16 which surrounds the primary coating. One or more additional, intermediate coatings can also be present between the primary and secondary coatings.

The glass fiber 12 is an uncoated optical fiber including a core and a cladding, as is familiar to the skilled artisan. The uncoated optical fiber may be any single mode or multimode fiber. The optical fiber may be adapted for use as a data transmission fiber (e.g. any standard single mode fiber such as SMF-28®, LEAF®, and METROCOR®, each of which is available from Corning Incorporated of Corning, N.Y.). Alternatively, the optical fiber may perform an amplification, dispersion compensation, or polarization maintenance function.

It should be appreciated by persons of skill in the art that preferred primary coatings that have a refractive index which differs from that of the cladding layer, as described above, can be achieved either by appropriate selection of the primary coating or appropriate selection of the cladding layer to be utilized, or a combination thereof. Thus, the selection of cladding and primary coating can be made to achieve the recited difference between their refractive indices, while also affording a suitable difference between the refractive indices of the core and cladding of the fiber to allow for optimal signal transmission in the fiber core and, preferably, avoid guiding optical signal via the cladding.

Primary coating 14 is formed from a soft crosslinked polymer material having a low Young's modulus (e.g., less than about 5 MPa at 25° C.) and a low glass transition temperature (e.g. less than about −10° C.). The primary coating should maintain adequate adhesion to the glass fiber during thermal and hydrolytic aging, yet be strippable therefrom for splicing purposes. The primary coating typically has a thickness in the range of 25-40 μm (e.g., about 32.5 μm), and the coatings of the present invention could be applied in these thicknesses if desired. Alternatively, a thin (e.g. less than 25, and more preferably less than 10 microns) primary coating could be applied, followed by a more conventional "primary" coating material, followed by a conventional secondary material. Primary coatings are typically applied to the glass fiber as a liquid and cured, as will be described in more detail hereinbelow. Conventional curable compositions used to form primary coatings are formulated using an oligomer, one or more monomer diluents, a photoinitiator, and other desirable additives (e.g., antioxidant). The preparation of primary coatings for optical fibers have been well-described in the past, and are familiar to the skilled artisan.

Suitable primary coatings are disclosed, for example, in U.S. Pat. Nos. 6,326,416, 6,539,152, 6,563,996, 6,584,263, and 6,775,451, and U.S. Patent Application Publication No. 2003/095770, each of which is incorporated herein by reference in its entirety.

Preferred primary coatings or recoat coatings are those containing a low urethane content. As used herein, "low urethane content" refers to primary coatings that contain less than about 2 percent by weight urethane. More preferred low urethane coatings contain less than about 1.5 percent, less than about 0.75 percent, or more preferably substantially no urethane (i.e., less than about 0.1 percent by weight).

Preferred primary coatings are also characterized by either (i) an absorbance of less than about 4.5 dB/cm at the operating wavelength, more preferably by an absorbance of less than about 4.0 dB/cm, 3.5 dB/cm, 3.0 dB/cm, or 2.5 dB/cm at the operating wavelength; (ii) a refractive index that is lower than the refractive index of a cladding layer of the optical fiber by more than about $3 \times 10^{-3}$ at a temperature of 100° C. or less, more preferably at a temperature of 50° C. or less and most preferably at room temperature at the operating wavelength, more preferably by more than about $4 \times 10^{-3}$, $5 \times 10^{-3}$, $6 \times 10^{-3}$, $7 \times 10^{-3}$, or $8 \times 10^{-3}$ at the operating wavelength; or (iii) any combination of (i) and (ii) as described above.

Preferred primary coatings can be further characterized by being substantially free of particulates, pigments or dyes that absorb at the operating wavelength.

Exemplary Coating 1 is a low urethane content, UV-curable, primary or re-coat coating composition. This composition includes the following components: KWS 4131 (urethane acrylate oligomer) Bomar Specialties Co. (Winsted, Conn.), 10% wt; Photomer 4028 (a difunctional monomer) (Cognis Corp. (Ambler, Pa.)), 82% wt; Photomer 3016 (a difunctional monomer) (Cognis Corp.), 5%; Irgacure 819 (photoinitiator) (Ciba Specialty Chemical (Tarrytown, N.Y.)), 1.5% wt.; Irgacure 184 (photoinitiator) (Ciba Specialty Chemical), 1.5% wt.; and Irganox 1035 (antioxidant) (Ciba Specialty Chemical), 0.5 pph. Similar low urethane coatings are described in U.S. Pat. No. 6,775,451, which is hereby incorporated by reference in its entirety. Other coating materials with even lower or no urethane, such as silicone resin formulations, could lower the heating even further.

Exemplary Coating 2 is a urethane-free, UV-curable, primary or re-coat coating composition. This composition includes the following components: Photomer 3016 (an epoxy diacrylate) (Cognis Corp.), 20% wt.; Photomer 4028 (a difunctional monomer) (Cognis Corp.), 20% wt.; Photomer 4025 (a difunctional monomer) (Cognis Corp.), 52% wt.; Irgacure 1850 (a photoinitiator) (Ciba Specialty Chemical), 3% wt.; and Irganox 1035 (antioxidant) (Ciba Specialty Chemical), 0.5 pph. This coating composition and other urethane-free coatings are described in U.S. Pat. No. 6,775,451, which is hereby incorporated by reference in its entirety. Although Exemplary Coating 2 has no urethane components, it does contain an epoxy acrylate component. While this represents a potential improvement over a urethane acrylate coating, this coating has a significant absorption peak near 1430-1440 nm.

Exemplary Coating 3 is a urethane-free, UV-curable, primary or re-coat coating composition. This composition includes the following components: Pentaerythritol tetrakis (3-mercaptopropionate) (a tetra-functional monomer) (Aldrich Chemicals (Milwaukee, Wis.)), 59% wt.; Triallyl-1,3,5-triazine-2,4,6-(1H,3H,5H)-trione (a tri-functional monomer) (Aldrich Chemicals (Milwaukee, Wis.)), 40% wt.; and Irgacure 184 (photoinitiator) (Ciba Specialty Chemical), 1% wt. Exemplary Coating 3 is a thiol-ene coating composition, which contains neither urethane nor epoxy acrylate functionality. Thiol-ene coating systems may show advantages over epoxy acrylate and low urethane coating systems in accordance with the present invention.

Exemplary Coating 4 is a UV-curable, primary or re-coat coating composition. This composition includes the following components: 20% Photomer 6008 (urethane acrylate) (Cognis Corp), 77% Photomer 4028 (an ethoxylated bisphenol A diacrylate) (Cognis Corp), 1.5% Irgacure 184 (a photoinitiator)(Ciba Specialty Chemicals), 1.5% Irgacure 819 (a photoinitiator)(Ciba Specialty Chemicals), 0.5 pph Irganox 1035 (an antioxidant)(Ciba Specialty Chemicals), and 0.1 pph blankophor KLA additive (an optical brightener)(Bayer)

Exemplary Coating 5 is a urethane free, UV-curable, primary or re-coat coating composition. This composition includes the following components: 20% Photomer 3016 (an epoxy diacrylate)(Cognis), 32% Triallyl-1,3,5-triazine-2,4,6-trione (a trifunctional monomer)(Aldrich Chemicals), 48% Pentaerythritol tetrakis(3-mercaptopropionate (a tetrathiol monomer) (Aldrich Chemicals), 1.5 pph Irgacure 184 (a photoinitiator)(Ciba Specialty Chemicals), 0.5 pph Irganox 1035 (an antioxidant)(Ciba Specialty Chemicals), and 0.1 pph Blankophor KLA additive (an optical brightener)(Bayer)

In coated optical fiber 10, primary coating 14 is surrounded by secondary coating 16. While in FIG. 1 the secondary coating is shown as being applied directly to the primary coating, the skilled artisan will recognize that there may be one or more intermediate coating layers deposited between the primary coating and the secondary coating. Secondary coating 16 is formed from a cured polymeric material, and typically has a thickness in the range of 20-35 µm (e.g. about 27.5 µm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g. the primary coating).

The cured polymeric material of secondary coating 16 of optical fiber preferably has a Young's modulus of at least about 1200 MPa. In desirable embodiments of the invention, the cured polymeric material of secondary coating 16 has a Young's modulus of at least about 1500 MPa. In especially desirable embodiments of the invention, the cured polymeric material of secondary coating 16 has a Young's modulus of at least about 1900 MPa. In desirable embodiments of the invention, the cured polymeric material of secondary coating 16 has an elongation to break of at least about 30%. In especially desirable embodiments of the invention, the cured polymeric material of secondary coating 16 has an elongation to break of at least about 40%. In desirable embodiments of the invention, the cured polymeric material of secondary coating 16 has an average tensile strength of at least about 48 MPa. In especially desirable embodiments of the invention, the cured polymeric material of secondary coating 16 has an average tensile strength of at least about 60 MPa. As used herein, the Young's modulus, elongation to break, and tensile strength of a cured polymeric material are measured using a tensile testing instrument (e.g. a Sintech MTS Tensile Tester, or an Instron Universal Material Test System) on a sample of a material shaped as a cylindrical rod about 0.0225" (571.5 µm) in diameter, with a gauge length of 5.1 cm, and a test speed of 2.5 cm/min.

Suitable secondary coatings include those described in U.S. Pat. No. 6,689,463, and U.S. patent application Ser. No. 10/454,984, filed Jun. 4, 2003, each of which is hereby incorporated by reference in its entirety. Other suitable secondary coatings are known in the art and can be utilized in accordance with the present invention.

The optical fiber to be used in the high power application can be either a whole, unspliced fiber, or the optical fiber can be a spliced fiber. For the whole (unspliced) optical fiber, the primary coating composition possesses the above-noted characteristics for (i) absorbance, (ii) refractive index, or (iii) combinations thereof. For spliced fibers, it is the recoat composition that possesses one of these characteristics.

Whole (unspliced) optical fibers for use in high power applications can be prepared according to standard procedures. Briefly, the process involves fabricating the glass fiber (using methods familiar to the skilled artisan), applying a primary coating composition to the glass fiber, polymerizing the primary coating composition to form the primary coating material, applying the curable composition described hereinabove to the coated glass fiber, and polymerizing the curable composition to form the cured polymeric material as the secondary coating of the optical fiber. Optionally, the secondary coating composition can be applied to the coated fiber before polymerizing the primary coating composition, in which case only a single polymerization step is employed.

The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. It is frequently advantageous to apply both a primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety. Of course, the primary coating composition can be applied and cured to form the primary coating material, then the secondary coating composition can be applied and cured to form the cured polymeric material of the secondary coating.

Spliced optical fibers can be prepared according to standard procedures. Briefly, the process involves stripping the coatings from the ends (thereby exposing the glass fiber) of two segments of optical fiber that are to be joined together. The ends of the two segments are then spliced together end-to-end, which is known as a butt splice, forming a splice junction. After creating the splice junction, the splice junction is coated with a coating composition so as to encapsulate the end sections of the first and second segments and contact the coatings of the first and second optical fiber segments (i.e., at the coating surface exposed when they were stripped). The coating composition is then cured, forming the recoat and thereby provide a re-coated optical fiber suitable for use in high power applications.

As a consequence of the selection of cladding and/or coating, the optical fiber, or a re-coated splice junction thereof, is characterized by a coefficient of heating that is small enough to prevent heating of the fiber coating (or recoat) above 100° C. for an optical power. The optical fiber is preferably characterized by a coefficient of heating that is less than about 0.07° C./mW, more preferably less than about 0.06° C./mW, about 0.05° C./mW, about 0.04° C./mW, or about 0.3° C./mW. Coefficients of heating that are even lower than about 0.03° C./mW are most preferred.

EXAMPLES

The Examples set forth below are for illustrative purposes only and are not intended to limit, in any way, the scope of the present invention.

Example 1

Photothermal Degradation of Splice Re-coat at Splice Junction

A Raman-pumped module was constructed using a dispersion compensating ("DC") fiber that was fusion spliced to a CS980 fiber (Corning Incorporated), and then re-coated with a standard ultraviolet curable urethane acrylate coating (Desolite 950-200, available from DSM Desotech Inc.). This was done by making seven loops of DC fiber with CS980 spliced on both ends. The spliced fiber was pumped with 3000 mW at 1480 nm. The maximum temperature of the splice re-coat region was measured using an Forward Looking Infrared (F.L.i.r.) camera. The temperature vs. input power of 1480 nm was measured using the Desolite 950-200 re-coat. The maximum temperature of the first upstream splice in the loop was 205° C. while the second splice downstream was 136° C.

After recording data, the Desolite 950-200 was stripped from the fiber splice and the same splices were re-coated with Exemplary Coating 1, and the test was repeated. The maximum temperature of the first upstream splice in the loop was 82° C. while the second splice downstream was 54° C.

Figure 3:
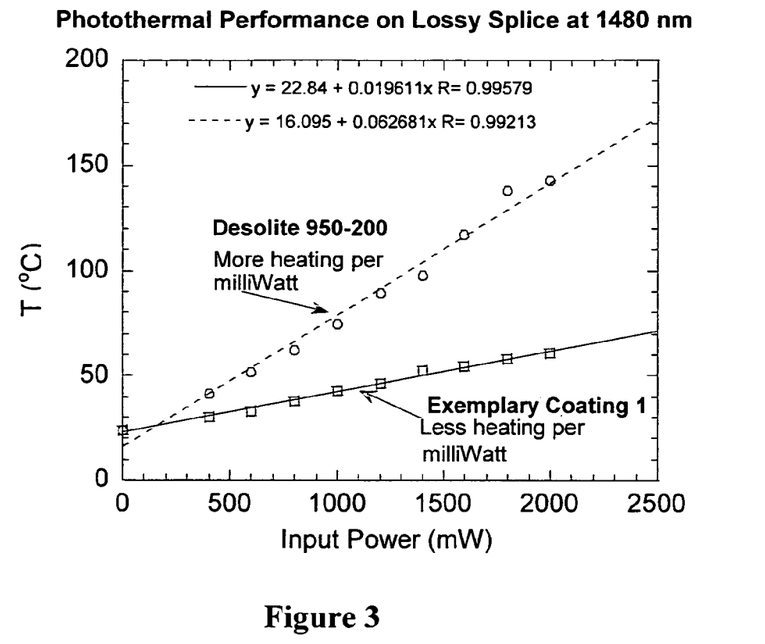
FIG. 3 is a graph showing photothermal heating results of DC fiber splice result comparing Desolite 950-200 vs. Exemplary Coating 1 low urethane re-coat material.

The photothermal coefficient for each splice fiber calculated by plotting temperature vs. input power and fitting the data. The slope gives the photothermal coefficient. The results show that Exemplary Coating 1, with low urethane content, significantly reduces the temperature rise in the splice region. The average heating coefficient for Desolite 950-200 was measured to be 0.086±0.015° C./mW, whereas the heating coefficient for Exemplary Coating 1 was measured to be 0.0264±0.0056° C./mW. FIG. 3 shows a comparison of the photothermal heating magnitude in these two re-coatings. When the induced temperature rise in Exemplary Coating 1 at 1.6 W is added to the expected ambient temperature of the module, i.e. 50° C., it is feasible that this coating can keep the total temperature at or below 100° C. and increase the lifetime of the coating indefinitely.

Figure 2:
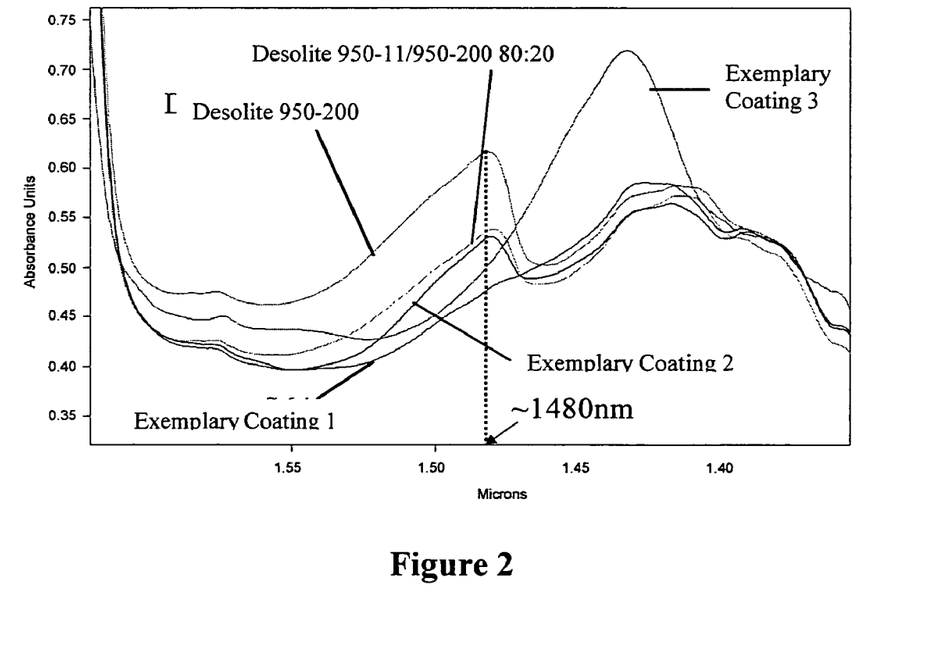
FIG. 2 is graph illustrating near infrared absorption spectra of a number of recoat formulations, including Desolite 950-200, 80:20 Desolite 950-111:950-200, Exemplary Coating 1, Exemplary Coating 4, and Exemplary Coating 5. The absorption at 1480 nm for Exemplary Coating 1 (low urethane content) re-coat is significantly lower than 950-200 (high urethane content) re-coat.

These results are explained by the absorption spectra for the re-coat formulations. FIG. 2 shows a comparison of the near infrared spectra of Desolite 950-200, an 80:20 formulation of Desolite 950-111:950-200, Exemplary Coating 1, Exemplary Coating 4, and Exemplary Coating 5. The absorption at 1480 nm is significantly lower for Exemplary Coating 1 than it is for Desolite 950-200. Based on the foregoing results, it is expected that both the 80:20 formulation of Desolite 950-111:950-200 and the Exemplary Coating 4 will achieve a substantial improvement over Desolite 950-200, particularly at 1480 nm where Raman amplification occurs. Moreover, it is expected that other coating materials with even lower urethane content or no urethane, such as silicone resin formulations, can lower the heating even further. Exemplary Coatings 2 and 3 are two such low-urethane compositions, described supra.

Example 2

Photothermal Degradation of Coatings in High Bend Application

Two optical fibers were prepared using SMF1528 glass fiber (Corning Incorporated). One fiber was coated with silicone as the primary coating (Q3-6696) Dow Corning, (Midland, Mich.) and Exemplary Coating 1 as the secondary coating. The other was coated with CPC6, a dual-layer acrylate coating produced by Corning Incorporated. Both fibers were subjected to 1.5 W at 1480 nm in a 2-point bending apparatus with a minimum bend radius of 1.75 mm (393 kpsi) (see FIG. 4). The output power after the bend was 1.33 W (~170 mW loss) for the fiber containing Exemplary Coating 1, compared to 50-60 mW (~loss 1.45 W) with the CPC6 coated fiber.

In contrast to the CPC6 coated fiber, which failed in 24 minutes, the fiber containing Exemplary Coating 1 maintained its integrity after seven days of testing. After seven days the fiber had not failed, nor did it show any signs of discoloration. The output power remained steady for the seven days. After seven days the fiber was removed from the test fixture and examined microscopically. No visible damage was observed. The exposed region of the specimen was then strength tested, and no strength degradation was found.

Example 3

Figure 5:
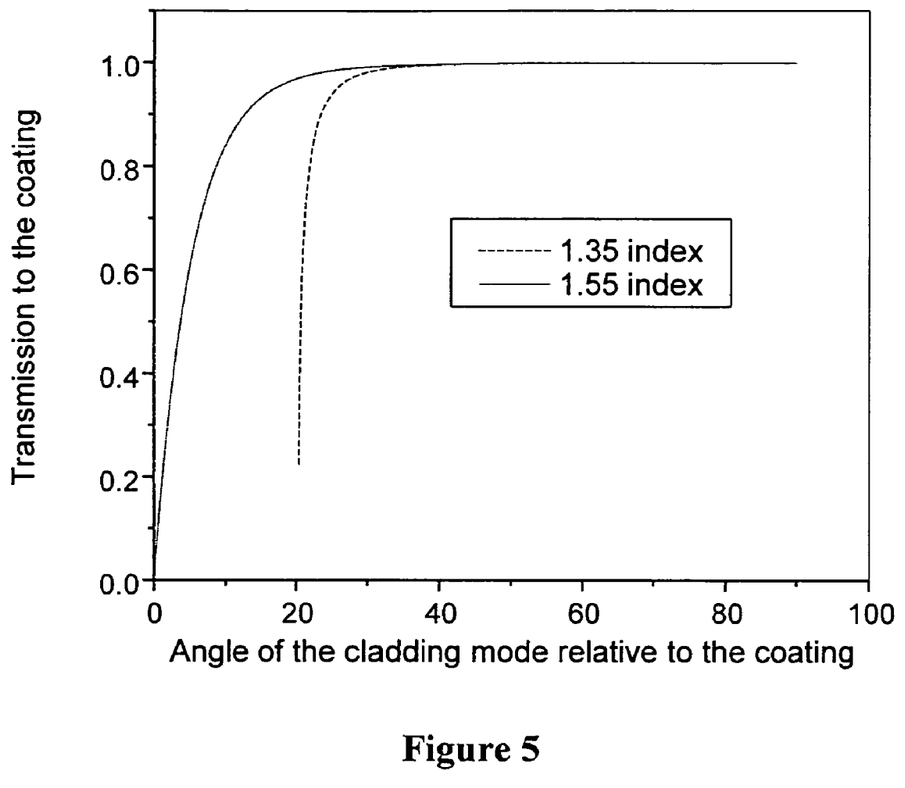
FIG. 5 is a graph showing relative transmission of cladding mode power to the re-coat material vs. entry angle for re-coats having refractive indices of 1.55 and 1.35, respectively.

Preparation and Testing of Spliced or Bent Fiber Possessing Primary Coating with an Index of Refraction That Differs From Cladding Index Another approach to lowering the localized photothermal temperature at the splice joint is to use a polymer coating material with a significantly lower index of refraction than the cladding of the fiber, which in a silica clad or fluorine doped silica clad fiber is approximately 1.43-1.446 at 1550 nm. When the angle of the cladding modes that arrive at the clad-coating interface is larger than the critical angle ($a = a_{sin}(n_{primary}/n_{clad})$), where $n_{primary}$ and $n_{clad}$ are refractive indices of the primary coating and cladding, respectively, the light will be partially reflected in accordance with the Fresnel formula. The larger the index mismatch is, the higher the amount of reflection there will be. By using a coating or a splice re-coat with an index of refraction lower than the cladding, light coupled to the cladding modes at the region of loss (e.g., splice or tight bend) will suffer from partially total internal reflection at the cladding-coating interface and travel longer in the cladding of the optical fiber. When this occurs, absorbed light in the coating material will spread over a longer distance and localized heating of the coating will be reduced. Even if the refractive index of the coating is significantly larger than $n_{clad}$, it would also result in some benefit, but less than in case of lower index. FIG. 5 shows the calculations of how much power gets transferred to the coating based on the Fresnel formula for two coatings, one with an index of 1.55 and another with an index of 1.35.

Example 4

Similar to the spliced fiber, in any bent fiber region which would normally cause overheating and destruction of the fiber, absorbed light in the coating material will spread over a longer distance and localized heating of the coating will be reduced. The desired index difference between glass cladding and primary coating should be at least higher than $3 \times 10^{-3}$. ($n_{clad} - n_{primary} > 3 \times 10^{-3}$). Because index of refraction of coatings typically decreases with increasing temperature, it is preferred that the coating exhibit this difference in index at a temperature of 100° C. or less, more preferably at a temperature of 50° C. or less It is also desirable that any light which escapes from the fiber core and becomes trapped in the glass cladding doesn't travel all the way to end of the fiber, as this would cause high power failure of the next optical component in the telecommunication line. If the index contrast between fiber glass cladding and primary coating is greater than or equal to $\sim 3 \times 10^{-3}$, the cladding light will dissipate to the primary and secondary coating over a short distance of the fiber length (i.e., 5 cm–10 m), thereby preventing localized heating and at the same time dissipating all cladding modes before they reach the end of the fiber link.

Compared to the silica glass found in the cladding of optical fibers, most polymers have a high, refractive index thermal coefficient $dn/dT \sim (1\text{-}4) \times 10^{-4}/C$. This creates a difficulty in that a splice junction or bend in the fiber will often result in heating of the fiber to a higher temperature (e.g. 100° C.). It is important that light guiding in the clad/primary coating region occur, even when such heating of the coating takes place at the splice or bent location. If the primary coating reaches a localized T of 100 C. at the loss location, its index typically drops by $\sim 1\text{-}4 \times 10^{-2}$. Consequently, the primary coating (i.e. the coating which contacts the cladding of the optical fiber) preferably has a lower refractive index than the glass at a temperature of 100° C. or less, more preferably at a temperature of 50° C. or less, and most preferably the primary coating has such a lower refractive index than the glass at room temperature. Temperatures of 50° C. or even as high as 100° C. or greater are achievable in lossy fiber bends or splice junctions. By tailoring the primary coating so that the refractive index of the primary coating is less than that of the glass fiber, light will be prevented from leaking into the coating and will instead be guided in the cladding glass region.

To illustrate this effect, several coatings, the formulations of which are listed below in Table 1, were tested using the apparatus illustrated in FIG. 4.

| Coating ID | |
|---|---|
| A) | 15% Photomer 6008 Urethane acrylate (Cognis) |
| | 9% Tone M-100 Caprolactone acrylate (Dow Chemical) |
| | 73% Photomer 4003 ethoxylatednonylphenol acrylate (Ciba Specialty Chemicals) |
| | 1.5% Irgacure 184 Photoinitiator (Ciba Specialty Chemicals) |
| | 1.5% Lucirin TPO Photoinitiator (BASF) |
| | 0.5 pph FAVE 4101 Difunctional monomer (Honeywell) |
| | 0.5 pph Irganox 1035 Antioxidant (Ciba Specialty Chemicals) |
| | 0.032 pph Pentaerythritol tetrakis(3-mercaptopropionate) Additive (Aldrich) |
| | 1 pph 3-acryloxypropyltrimethoxysilane Adhesion promoter (Gelest) |
| B) | 15% Photomer 6008 Urethane acrylate (Cognis) |
| | 9% Tone M-100 Caprolactone acrylate (Dow Chemical) |
| | 19% Viscoat 8F fluorinated acrylate (KOWA America) |
| | 54% Photomer 4003 ethoxylatednonylphenol acrylate (Ciba Specialty Chemicals) |
| | 1.5% Irgacure 184 Photoinitiator (Ciba Specialty Chemicals) |
| | 1.5% Lucirin TPO Photoinitiator (BASF) |
| | 0.5 pph FAVE 4101 Difunctional monomer (Honeywell) |
| | 0.5 pph Irganox 1035 Antioxidant (Ciba Specialty Chemicals) |

-continued

| Coating ID | |
|---|---|
| | 0.032 pph Pentaerythritol tetrakis(3-mercaptopropionate) Additive (Aldrich) |
| | 1 pph 3-acryloxypropyltrimethoxysilane Adhesion promoter (Gelest) |
| C) | 15% Photomer 6008 Urethane acrylate (Cognis) |
| | 9% Tone M-100 Caprolactone acrylate (Dow Chemical) |
| | 36.5% Viscoat 8F fluorinated acrylate (KOWA America) |
| | 36.5% Photomer 4003 ethoxylatednonylphenol acrylate (Ciba Specialty Chemicals) |
| | 1.5% Irgacure 184 Photoinitiator (Ciba Specialty Chemicals) |
| | 1.5% Lucirin TPO Photoinitiator (BASF) |
| | 0.5 pph FAVE 4101 Difunctional monomer (Honeywell) |
| | 0.5 pph Irganox 1035 Antioxidant (Ciba Specialty Chemicals) |
| | 0.032 pph Pentaerythritol tetrakis(3-mercaptopropionate) Additive (Aldrich) |
| | 1 pph 3-acryloxypropyltrimethoxysilane Adhesion promoter (Gelest) |
| D) | 15% Photomer 6008 Urethane acrylate (Cognis) |
| | 9% Tone M-100 Caprolactone acrylate (Dow Chemical) |
| | 55% Viscoat 8F fluorinated acrylate (KOWA America) |
| | 18% Photomer 4003 ethoxylatednonylphenol acrylate (Ciba Specialty Chemicals) |
| | 1.5% Irgacure 184 Photoinitiator (Ciba Specialty Chemicals) |
| | 1.5% Lucirin TPO Photoinitiator (BASF) |
| | 0.5 pph FAVE 4101 Difunctional monomer (Honeywell) |
| | 0.5 pph Irganox 1035 Antioxidant (Ciba Specialty Chemicals) |
| | 0.032 pph Pentaerythritol tetrakis(3-mercaptopropionate) Additive (Aldrich) |
| | 1 pph 3-acryloxypropyltrimethoxysilane Adhesion promoter (Gelest) |
| E) | 15% Photomer 6008 Urethane acrylate (Cognis) |
| | 9% Tone M-100 Caprolactone acrylate (Dow Chemical) |
| | 73% Viscoat 8F fluorinated acrylate (KOWA America) |
| | 1.5% Irgacure 184 Photoinitiator (Ciba Specialty Chemicals) |
| | 1.5% Lucirin TPO Photoinitiator (BASF) |
| | 0.5 pph FAVE 4101 Difunctional monomer (Honeywell) |
| | 0.5 pph Irganox 1035 Antioxidant (Ciba Specialty Chemicals) |
| | 0.032 pph Pentaerythritol tetrakis(3-mercaptopropionate) Additive (Aldrich) |
| | 1 pph 3-acryloxypropyltrimethoxysilane Adhesion promoter (Gelest) |

Figure 4:
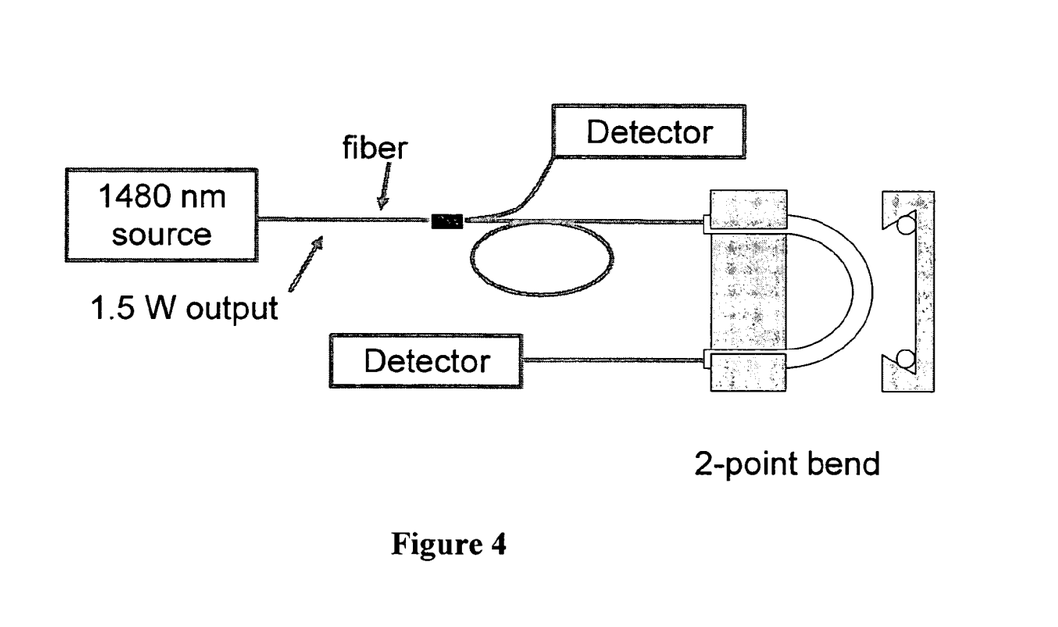
FIG. 4 is a schematic drawing of a two-point bending apparatus. The bend radius can be fixed or adjustable. In Example 2, the apparatus was used with a minimum bend radius of 1.75 mm. Loss of power caused by the fiber bend was measured using two detectors, one positioned upstream of the bend and the other positioned downstream of the bend. The difference in detected power represents the signal loss as a result of signal outcoupling from the glass fiber to the coating.

The test set-up is shown schematically in FIG. 4. The 2-point bending fixture consisted of beveled slots in a machineable ceramic material. Fiber is manually bent in a large loop and then pulled into the beveled groove in the ceramic. This classic 2-point bend configuration places the glass in an ellipse, where the maximum tensile stress is located at the minimum bend radius halfway about the bend. The bend-induced tensile stress decays from the maximum bend stress to zero where the fiber is in contact with the fixture. The maximum bend stress used was 3.35 GPa (486 kpsi) and corresponds with a minimum bend radius of 1.45 mm. This represents an extreme bending condition where nearly all the input signal is forced from the core into glass cladding of the fiber. A 95/5 coupler was used to monitor input power. The fiber under test was fusion spliced to the 95 side of the coupler with a splice loss less than 0.1 dB. The fiber was then passed through the bend fixture to a high power detector. The detector was used to determine the amount of bend-induced power loss in the fiber. Failure times were visually recorded using a video camera with a lens magnification of 30×. A 1480 nm Raman fiber laser with a power level of 1.45 W was used in the test. The glass design was a standard single-mode fiber and the coating dimensions were the typical inner primary coating diameter of 190 microns and an outer primary diameter of 245 microns. The fiber has a step index profile with an approximately 0.35% index Delta ($\Delta n/n$), a core diameter of about 8.3 microns, and a mode field diameter of 10.5 microns at 1550 nm.

CPC-6 and CPC-7 are prior art coating compositions. Sample F is Q3-6696, a UV curable silicone based material which is available from Dow Corning, Midland, Mich. The results, illustrated in Table 2 below, show that failure times increased as the coating index of refraction decreases. This is especially so as the index approaches and is below that of silica (1.44). Table 2 also shows that for coating having an index of refraction below that of the silica cladding (i.e. about 1.44), no failures were recorded and much of the power was not allowed to pass from the glass cladding into the coatings. Of particular interest is Coating D. The relatively high percent input power (95%) indicates that a high amount of the increased power due to the bend was stripped out of the cladding and into the coating. As a result, this power will not be transmitted down the fiber to the next component. Simultaneously, coating D lasted 168 minutes before failing, significantly longer than the other coatings. Thus, coating D keeps potentially hazardous cladding power from reaching downstream equipment while maintaining a long lifetime in comparison to coatings with higher index.

| Coating type | Coating Index | % input power into coating due to bend | mean time to failure, minutes |
|---|---|---|---|
| CPC6 | | 96 | 15 |
| CPC7 | | 96 | 29 |
| D1806 | 1.49568 | 99 | 5 |
| D1805 | 1.47948 | 97 | 15 |
| D1804 | 1.46298 | 96 | 37 |
| D1803 | 1.44275 | 95 | 168 |
| D1769 | 1.41798 | 23 | no failures |
| D1771 (silicone) | 1.413 | 22 | no failures |

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of minimizing localized heating of an optical fiber used in transmission of a high power optical signal at an operating wavelength, said method comprising:
    providing an optical fiber which is single mode over an operating wavelength band between 1400 and 1620, said fiber comprising a polymer coating characterized by an absorbance of less than about 4.5 dB/cm at the operating wavelength or a refractive index lower than the refractive index of a cladding layer of the optical fiber by more than about $3 \times 10^{-3}$ at the operating wavelength at a temperature of 100° C. or less, or both; and
    transmitting an optical power greater than about 250 mW through the optical fiber.

2. The method of claim 1, wherein said coating is a primary coating applied directly onto the glass cladding of the optical fiber.

3. The method of claim 2, wherein said coating comprises a refractive index lower than the refractive index of a cladding layer of the optical fiber by more than about 3×103 at the operating wavelength at a temperature of 50° C. or less.

4. The method of claim 2, wherein said coating comprises a refractive index lower than the refractive index of a cladding layer of the optical fiber by more than about $3 \times 10^{-3}$ at the operating wavelength at room temperature.

5. The method according to claim 2, wherein the coating is characterized by an absorbance of less than about 2.5 dB/cm at the operating wavelength.

6. The method according to claim 2, wherein the coating is characterized by a refractive index lower than the refractive index of a cladding layer of the optical fiber by more than about $8 \times 10^{-3}$ at the operating wavelength at a temperature of 100° C. or less.

7. The method of claim 2, wherein said primary coating is less than 15 microns thick.

8. The method of claim 1, wherein said transmitting results in localized heating of the optical fiber at a coefficient of heating that is less than about 0.07° C./mW.

9. The method according to claim 1, wherein the coating is characterized by an absorbance of less than about 4.5 dB/cm at the operating wavelength.

10. The method according to claim 1, wherein the coating is characterized by both an absorbance of less than about 4.5 dB/cm at the operating wavelength and a refractive index which is lower than the refractive index for a cladding layer of the optical fiber by more than about $3 \times 10^{-3}$ at the operating wavelength at a temperature of 100° C. or less.

11. The method according to claim 1, wherein the signal is transmitted at a power of about 250 mW or greater.

12. The method according to claim 1, wherein the signal is transmitted at a wavelength between about 1430-1600 nm.

13. The method according to claim 1, wherein the coating comprises a urethane content of less than about 2 percent by weight.

14. The method of claim 1, wherein said coating is applied over a junction of two fibers spliced together and:
said transmitting results in a signal loss across said splice junction or a fiber bend that is less than about 250 mW at the operating wavelength.

15. The method of claim 1, wherein the index of refraction of said coating is 1.413 or higher.

16. The method of claim 1, wherein said refractive index of said coating is lower than the refractive index of said fiber by no more than about $33 \times 10^{-3}$.

17. A method of minimizing localized heating of an optical fiber used in transmission of a high power optical signal at an operating wavelength, said method comprising:
providing an optical fiber which comprises a coating characterized by an absorbance of less than about 4.5 dB/cm at the operating wavelength or a refractive index lower than the refractive index of a cladding layer of the optical fiber by more than about $3 \times 10^{-3}$ at the operating wavelength at a temperature of 100° C. or less, or both; and
transmitting an optical power greater than about 250 mW through the optical fiber, wherein said transmitting results in localized heating of the optical fiber at a coefficient of heating that is less than about 0.07° C./mW.

* * * * *